United States Patent [19]

Smalley

[11] Patent Number: 5,015,424
[45] Date of Patent: May 14, 1991

[54] METHODS AND APPARATUS FOR PRODUCTION OF THREE-DIMENSIONAL OBJECTS BY STEREOLITHOGRAPHY

[75] Inventor: Dennis R. Smalley, Baldwin Park, Calif.

[73] Assignee: 3D Systems, Inc., Valencia, Calif.

[21] Appl. No.: 183,015

[22] Filed: Apr. 18, 1988

[51] Int. Cl.$^5$ .............................................. B29C 35/08
[52] U.S. Cl. ................................... 264/22; 156/273.3; 156/273.5; 264/308; 425/174.4; 427/43.1; 427/54.1
[58] Field of Search ................... 264/22, 25, 40.1, 250, 264/255, 298, 308; 427/43.1, 54.1; 156/58, 273.3, 273.5, 275.5; 425/174.4; 365/106, 107, 119, 120, 127

[56] References Cited

U.S. PATENT DOCUMENTS

| | | | |
|---|---|---|---|
| 2,775,758 | 12/1956 | Munz | 156/58 |
| 4,575,330 | 3/1986 | Hull | 425/174.4 |
| 4,752,498 | 6/1988 | Fudim | 427/54.1 |
| 4,801,477 | 1/1989 | Fudim | 427/54.1 |

FOREIGN PATENT DOCUMENTS 0250121 2/1987 European Pat. Off. .

OTHER PUBLICATIONS

Herbert "Solid Object Generation", J. App. Photo. Eng., vol. 8, No. 4, Aug. 1982, pp. 185-188.
Kodama "Automatic Method for Fabricating a Three-Dimensional Plastic Model with Photo-Hardening Polymer", Rev. Sci. Instrum., 52(11), Nov. 1981, pp. 1770-1773.

Primary Examiner—Mary Lynn Theisen
Attorney, Agent, or Firm—Lyon & Lyon

[57] ABSTRACT

An improved stereolithography system for generating a three-dimensional object by creating a cross-sectional pattern of the object to be formed at a selected surface of a fluid medium capable of altering its physical state in response to appropriate synergistic stimulation by impinging radiation, particle bombardment or chemical reaction, information defining the object being specially processed to reduce curl, stress, birdnesting and other distortions, the successive adjacent laminae, representing corresponding successive adjacent cross-sections of the object, being automatically formed and integrated together to provide a step-wise laminar buildup of the desired object, whereby a three-dimensional object is formed and drawn from a substantially planar surface of the fluid medium during the forming process.

50 Claims, 8 Drawing Sheets

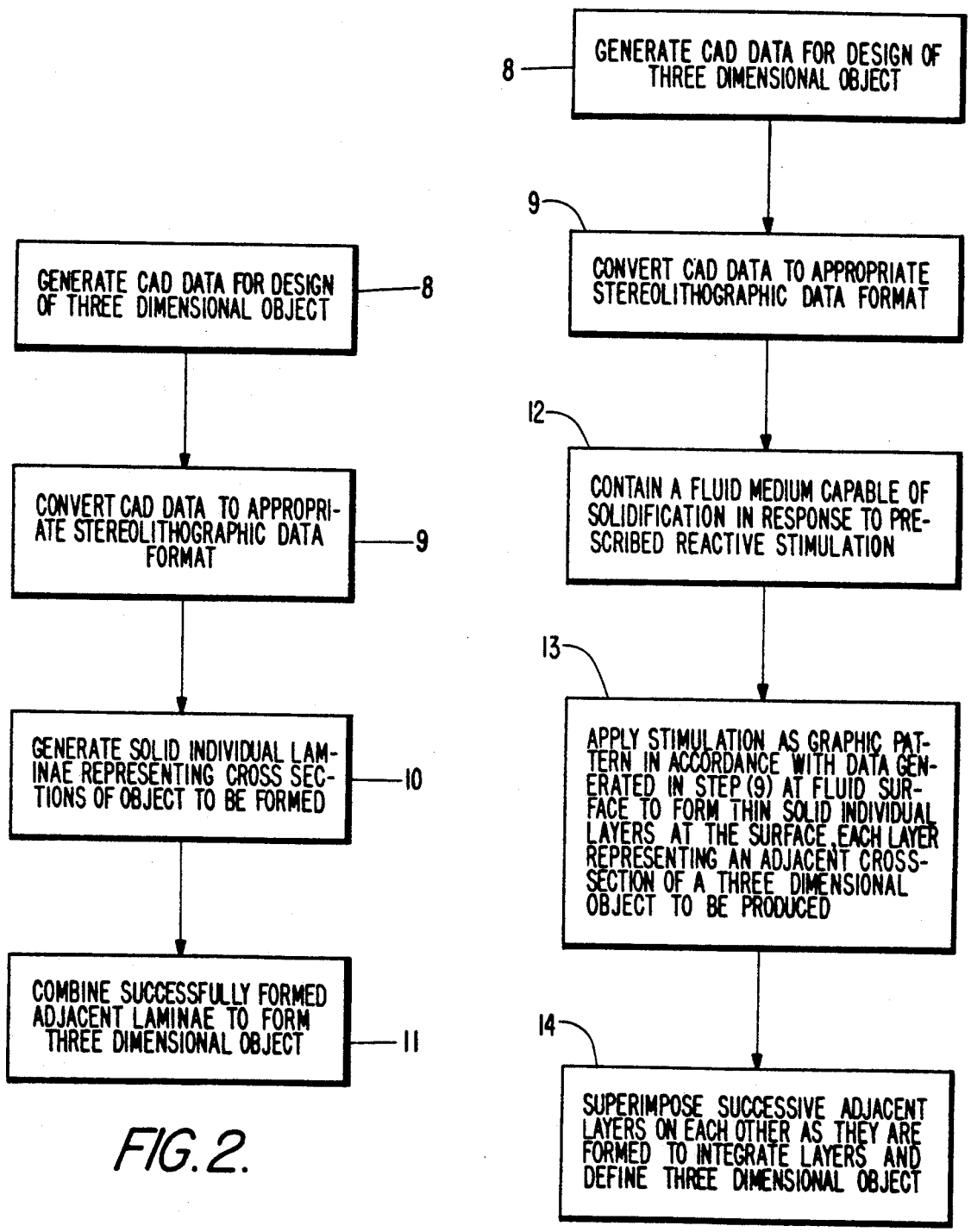

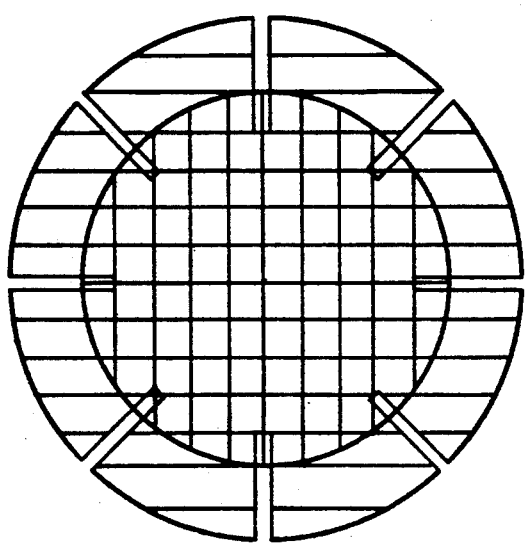
FIG. 18.
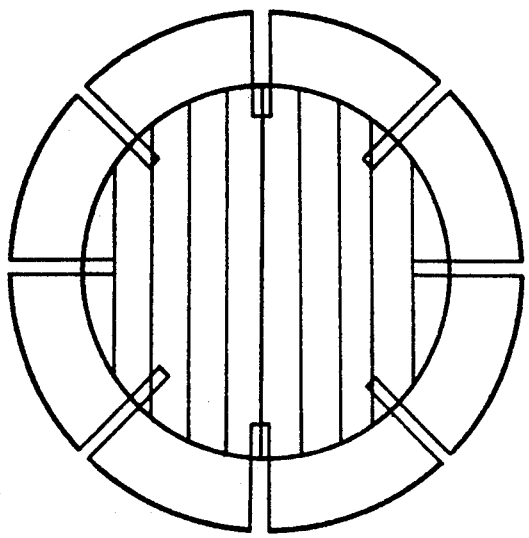
FIG. 19.
FIG. 20.
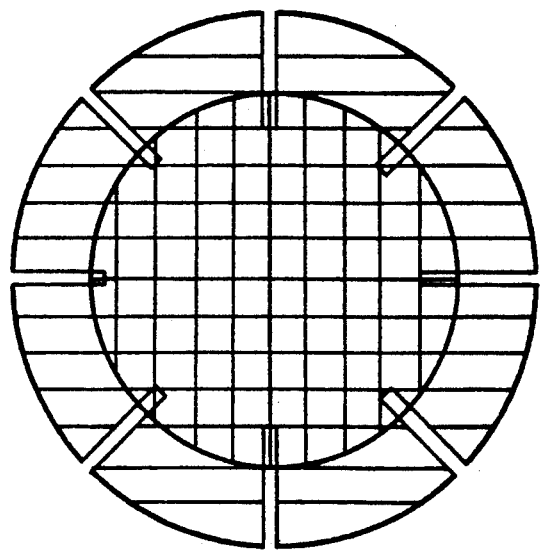

METHODS AND APPARATUS FOR PRODUCTION OF THREE-DIMENSIONAL OBJECTS BY STEREOLITHOGRAPHY

CROSS-REFERENCE TO RELATED PATENT APPLICATIONS

This application is related by subject matter to each of the following patent applications filed concurrently herewith:

| Title | Inventors | U.S. Pat. application Ser. No. |
|---|---|---|
| METHODS AND APPARATUS FOR PRODUCTION OF THREE-DIMENSIONAL OBJECTS BY STEREO-LITHOGRAPHY | Charles W. Hull Stuart T. Spence Charles W. Lewis Wayne A. Vinson Raymond S. Freed | 182,823 |
| METHODS AND APPARATUS FOR PRODUCTION OF THREE-DIMENSIONAL OBJECTS BY STEREO-LITHOGRAPHY | Charles W. Hull Stuart T. Spence David J. Albert Dennis R. Smalley Richard A. Harlow Phil Steinbaugh Harry L. Tarnoff Hop D. Nguyen Charles W. Lewis Tom J. Vorgitch David Z. Remba | 182,830 |
| METHODS AND APPARATUS FOR PRODUCTION OF THREE-DIMENSIONAL OBJECTS BY STEREO-LITHOGRAPHY | Charles W. Hull Charles W. Lewis | 182,801 |
| METHODS AND APPARATUS FOR PRODUCTION OF THREE-DIMENSIONAL OBJECTS BY STEREO-LITHOGRAPHY | Borzo Modrek | 183,016 |
| METHODS AND APPARATUS FOR PRODUCTION OF THREE-DIMENSIONAL OBJECTS BY STEREO-LITHOGRAPHY | Charles W. Hull | 183,014 |
| METHODS AND APPARATUS FOR PRODUCTION OF THREE-DIMENSIONAL OBJECTS BY STEREO-LITHOGRAPHY | Raymond S. Freed | 183,012 |

All of these cases are assigned to a common assignee, 3D Systems, Inc., 26081 Avenue Hall, Valencia, Calif. 91355, and the entire subject matter of each of these related applicants is specifically incorporated by reference, as though attached hereto, in the present application as part of the disclosure of the present application. Authorization for making copies of these applications, as originally filed in the Patent and Trademark Office, for transfer to the present case, is specifically granted to the Examiner, if the Examiner determines such copies are necessary or desirable. However, the disclosure for the invention specifically claimed in the present application is considered completely adequate, as presented in the present application, to enable one of ordinary skill in the art to which the invention pertains to make and practice the invention

BACKGROUND OF THE INVENTION

This invention relates generally to improvements in methods and apparatus for forming three-dimensional objects from a fluid medium and, more particularly, to new and improved stereolithography systems involving the application of enhanced data manipulation and lithographic techniques to production of three-dimensional objects, whereby such objects can be formed more rapidly, reliably, accurately and economically.

It is common practice in the production of plastic parts and the like to first design such a part and then painstakingly produce a prototype of the part, all involving considerable time, effort and expense. The design is then reviewed and, oftentimes, the laborious process is again and again repeated until the design has been optimized. After design optimization, the next step is production. Most production plastic parts are injection molded. Since the design time and tooling costs are very high, plastic parts are usually only practical in high volume production. While other processes are available for the production of plastic parts, including direct machine work, vacuum-forming and direct forming, such methods are typically only cost effective for short run production, and the parts produced are usually inferior in quality to molded parts.

Very sophisticated techniques have been developed in the past for generating three-dimensional objects within a fluid medium which is selectively cured by beams of radiation brought to selective focus at prescribed intersection points within the three-dimensional volume of the fluid medium. Typical of such three-dimensional systems are those described in U.S. Pat. Nos. 4,041,476; 4,078,229; 4,238,840 and 4,288,861. All of these systems rely upon the buildup of synergistic energization at selected points deep within the fluid volume, to the exclusion of all other points in the fluid volume. Unfortunately, however, such three-dimensional forming systems face a number of problems with regard to resolution and exposure control. The loss of radiation intensity and image forming resolution of the focused spots as the intersections move deeper into the fluid medium create rather obvious complex control situations. Absorption, diffusion, dispersion and diffraction all contribute to the difficulties of working deep within the fluid medium on an economical and reliable basis.

In recent years, "stereolithography" systems, such as those described in U.S. Pat. No. 4,575,330 entitled "Apparatus For Production Of Three-Dimensional Objects By Stereolithography" have come into use. Basically, stereolithography is a method for automatically building complex plastic parts by successively printing cross-sections of photopolymer (such as liquid plastic) on top of each other until all of the thin layers are joined together to form a whole part. With this technology, the parts are literally grown in a vat of liquid plastic. This method of fabrication is extremely powerful for quickly reducing design ideas to physical form and for making prototypes.

Photocurable polymers change from liquid to solid in the presence of light and their photospeed with ultraviolet light (ULV) is fast enough to make them practical model building materials. The material that is not polymerized when a part is made is still usable and remains in the vat as successive parts are made. An ultraviolet laser generates a small intense spot of UV. This spot is moved across the liquid surface with a galvanometer mirror X-Y scanner. The scanner is driven by computer generated vectors or the like. Precise complex patterns can be rapidly produced with this technique.

The laser scanner, the photopolymer vat and the elevator, along with a controlling computer, combine together to form a stereolithography apparatus, referred to as "SLA". An SLA is programmed to automatically make a plastic part by drawing are cross section at a time, and building it up layer by layer.

Stereolithography represents an unprecedented way to quickly make complex or simple parts without tooling. Since this technology depends on using a computer to generate its cross sectional patterns, there is a natural data link to CAD/CAM. However, such systems have encountered difficulties relating to shrinkage, curl and other distortions, as well as resolution, accuracy and difficulties in producing certain object shapes.

Objects built using stereolithography have a tendency to distort from their CAD designed dimensions. This distortion may or may not appear in a specific object, based on how much stress is developed by the specific cure parameters and on the object's ability to withstand stress. The stress that causes distortion develops when material that is being converted from liquid to solid comes into contact with and bonds to previously cured material. When material is converted from liquid to solid it shrinks slightly. This shrinking causes stress and has two primary physical causes: (1) density of the liquid is less than that of the solid plastic; and (2) the chemical reaction that causes the change of state is strongly exothermic causing the curing material to thermally expand and contract.

Certain sections of an object will be able to resist stresses without any apparent warp (stress is at a tolerable level). On the other hand, other sections may distort considerably as the stress and structural strength balance each other. Since stress is caused by contact between curing material and cured material it can be propagated along the entire length of contact between the curing line and cured material. Most contact of curing to cured material occurs from one layer to the next as opposed to along a single layer. This implies most distortions will be vertical in nature as opposed to horizontal. Therefore, there has been a need for a technique to reduce vertical distortions.

"Birdnesting" is a phenomena that can occur on parts that require down-facing, near-flat skin by the stereolithographic's slicing program. Areas require down-facing, near-flat skin because their boundary vectors do not have any support when they are drawn. By the time cross-hatch is finally drawn, to secure the boundaries, the boundary vectors may have moved away from their proper positions and, therefore, may not be secured at particular locations. These unsecured boundaries can move up and down and give a rough surface finish to the object, similar to a bird's nest.

Hence, workers in the art have recognized the need for a solution to the aforedescribed problems encountered in stereolithographics, and there continues to be a long existing need in the design and production arts for the capability of rapidly and reliably moving from the design stage to the prototype stage and to ultimate production, particularly moving directly from the computer designs for such plastic parts to virtually immediate prototypes and the facility for large scale production on an economical and automatic basis.

Accordingly, those concerned with the development and production of three-dimensional plastic objects and the like have long recognized the desirability for further improvement in more rapid, reliable, economical and automatic means which would facilitate quickly moving from a design stage to the prototype stage and to production, while avoiding the problems of stress, distortion and poor part finish. The present invention clearly fullfills all of these needs.

SUMMARY OF THE INVENTION

Briefly, and in general terms, the present invention provides a new and improved stereolithography system for generating a three-dimensional object by forming successive, adjacent, cross-sectional laminae of that object at the face of a fluid medium capable of altering its physical state in response to appropriate synergistic stimulation, information defining the object being specially tailored to reduce curl, stress, birdnesting and other distortions, the successive laminae being automatically integrated as they are formed to define the desired three-dimensional object.

In accordance with the invention, distortion is reduced by isolating sections of an object so that stress cannot be transmitted from one section to another. This isolation technique (smalleys) limits the distortion in a given section to that which can be caused by the stress developed within that section only, not from other sections.

Layer sections prone to curling may be isolated by designing small holes or gaps at stress points in the CAD design of the part. These gaps, called "smalleys", block propagation of stresses along layer sections. This reduces the stresses acting on a part to only those created within the section. If the smalleys are properly designed, these localized stresses will be below the threshold value which would curl the layer section.

Smalleys are also used to reduce birdnesting. The width of smalleys, for this application, is generally less than 1 cure width, so that after curing they are completely filled in and so no structural integrity is lost through their use. Smalleys are placed periodically in regions of down-facing near-flat triangles with heights appropriate to extend vertically through the near-flat triangles. The placement of smalleys is based on several factors that affect the likelihood of having birdnesting problems: the radius of curvature of the boundaries, the length of near-flat zones, the likelihood of boundaries moving, etc. Smalleys do not need to penetrate completely through a wall, as they do in their other application, but they do need to penetrate deep enough to insure a contact point with the boundaries on the previous layer.

The present invention harnesses the principles of computer generated graphics in combination with stereolithography, i.e. the application of lithographic techniques to the production of three-dimensional objects, to simultaneously execute computer aided design (CAD) and computer aided manufacturing (CAM) in producing three-dimensional objects directly from computer instructions. The invention can be applied for the purposes of sculpturing models and prototypes in a design phase of product development, or as a manufacturing system, or even as a pure art form.

"Stereolithography" is a method and apparatus for making solid objects by successively "printing" thin layers of a curable material, e.g., a UV curable material, one on top of the other. A programmed movable spot beam of UV light shining on a surface or layer of UV curable liquid is used to form a solid cross-section of the object at the surface of the liquid. The object is then moved, in a programmed manner, away from the liquid surface by the thickness of one layer, and the next cross-section is then formed and adhered to the immediately preceding layer defining the object. This process is continued until the entire object is formed.

Essentially all types of object forms can be created with the technique of the present invention. Complex forms are more easily created by using the functions of a computer to help generate the programmed commands and to then send the program signals to the stereolithographic object forming subsystem.

Of course, it will be appreciated that other forms of appropriate synergistic stimulation for a curable fluid medium, such as particle bombardment (electron beams and the like), chemical reactions by spraying materials through a mask or by ink jets, or impinging radiation other than ultraviolet light, may be used in the practice of the invention without departing from the spirit and scope of the invention.

By way of example, in the practice of the present invention, a body of a fluid medium capable of solidification in response to prescribed stimulation is first appropriately contained in any suitable vessel to define a designated working surface of the fluid medium at which successive cross-sectional laminae can be generated. Thereafter, an appropriate form of synergistic stimulation, such as a spot of UV light or the like, is applied as a graphic pattern at the specified working surface of the fluid medium to form thin, solid, individual layers at the surface, each layer representing an adjacent cross-section of the three-dimensional object to be produced. In accordance with the invention, information defining the object is specially processed to reduce curl and distortion, and increase resolution, strength, accuracy, speed and economy of reproduction.

Superposition of successive adjacent layers on each other is automatically accomplished, as they are formed, to integrate the layers and define the desired three-dimensional object. In this regard, as the fluid medium cures and solid material forms as a thin lamina at the working surface, a suitable platform to which the first lamina is secured is moved away from the working surface in a programmed manner by any appropriate actuator, typically all under the control of a micro-computer or the like. In this way, the solid material that was initially formed at the working surface is moved away from that surface and new liquid flows into the working surface position. A portion of this new liquid is, in turn, converted to solid material by the programmed UV light spot to define a new lamina, and this new lamina adhesively connects to the material adjacent to it, i.e. the immediately preceding lamina. This process continues untie the entire three-dimensional object has been formed. The formed object is then removed from the container and the apparatus is ready to produce another object, either identical to the first object or an entirely new object generated by a computer or the like.

The data base of a CAD system can take several forms. One form consists of representing the surface of an object as a mesh of polygons, typically triangles. These triangles completely form the inner and outer surfaces of the object. This CAD representation also includes a unit length normal vector for each triangle. The normal points away from the solid which the triangle is bounding and indicates slope. Means are provided for processing CAD data, which may be in the form of "PHIGS" or the like, into layer-by-layer vector data that can be used for forming models through stereolithography. Such information may ultimately be converted to raster scan output data or the like.

As previously indicated, stereolithography is a three-dimensional printing process which uses a moving laser beam to build parts by solidifying successive layers of liquid plastic. This method enables a designer to create a design on a CAD system, applying the concepts of this invention, to reduce curl, stress, birdnesting and other distortions and build an accurate plastic model in a few hours. By way of example, stereolithography may include the following steps.

First, the solid model is designed in the normal way on the CAD system, without specific reference to the stereolithographic process.

Model preparation for stereolithography involves selecting the optimum orientation, adding supports, building in appropriate stress relief, and selecting the operating parameters of the stereolithography system. The optimum orientation will (1) enable the object to drain, (2) have the least number of unsupported surfaces, (3) optimize important surfaces, and (4) enable the object to fit in the resin vat. Supports must be added to secure unattached sections and for other purposes, and a CAD library of supports can be prepared for this purpose. The stereolithography operating parameters include selection of the model scale and layer (slice) thickness.

The surface of the solid model is then divided into triangles, typically "PHIGS". A triangle is the least complex polygon for vector calculations. The more triangles formed, the better the surface resolution and hence, the more accurate the formed object with respect to the CAD design.

Data points representing the triangle coordinates and normals thereto are then transmitted typically as PHIGS, to the stereolithographic system via appropriate network communication such as ETHERNET. The software of the stereolithographic system then slices the triangular sections horizontally (X-Y plane) at the selected layer thickness.

The stereolithographic unit (SLA) next calculates the section boundary hatch, and horizontal surface (skin) vectors. Hatch vectors consist of cross-hatching between the boundary vectors. Several "styles" or slicing formats are available. Skin vectors, which are traced at high speed and with a large overlap, form the outside horizontal surfaces of the object. Interior horizontal areas, those within top and bottom skins, are not filled in other than by cross-hatch vectors.

The SLA then forms the object one horizontal layer at a time by moving the ultraviolet beam of a helium-cadmium laser or the like across the surface of a photocurable resin and solidifying the liquid where it strikes. Absorption in the resin prevents the laser light from penetrating deeply and allows a thin layer to be formed. Each layer is comprised of vectors which are typically drawn in the following order: border, hatch, and surface.

The first layer that is drawn by the SLA adheres to a horizontal platform located just below the liquid surface. This platform is attached to an elevator which then lowers the platform under computer control. After drawing a layer, the platform dips a short distance, such as several millimeters into the liquid to coat the previous cured layer with fresh liquid, then rises up a smaller distance leaving a thin film of liquid from which the second layer will be formed. After a pause to allow the liquid surface to flatten out, the next layer is drawn. Since the resin has adhesive properties, the second layer becomes firmly attached to the first. This process is repeated until all the layers have been drawn and the entire three-dimensional object is formed. Normally, the bottom 0.25 inch or so of the object is a support structure on which the desired part is built. Resin that has not been exposed to light remains in the vat to be used for the next part. There is very little waste of material.

Post processing typically involves draining the formed object to remove excess resin, ultraviolet or heat curing to complete polymerization, and removing supports. Additional processing, including sanding and assembly into working models, may also be performed.

The new and improved stereolithographic system of the present invention has many advantages over currently used apparatus for producing plastic objects. The methods and apparatus of the present invention avoid the need of producing design layouts and drawings, and of producing tooling drawings and tooling. The designer can work directly with the computer and a stereolithographic device, and when he is satisfied with the design as displayed on the output screen of the computer, he can fabricate a part for direct examination. If the design has to be modified, it can be easily done through the computer, and then another part can be made to verify that the change was correct. If the design calls for several parts with interacting design parameters, the method of the invention becomes even more useful because all of the part designs can be quickly changed and made again so that the total assembly can be made and examined, repeatedly if necessary. Moreover, the data manipulation techniques of the present invention enable production of objects with reduced stress, curl and distortion, and increased resolution, strength accuracy, speed and economy of production, even for difficult and complex object shapes.

After the design is complete, part production can begin immediately, so that the weeks and months between design and production are avoided. Stereolithography is particularly useful for short run production because the need for tooling is eliminated and production set-up time is minimal. Likewise, design changes and custom parts are easily provided using the technique. Because of the ease of making parts, stereolithography can allow plastic parts to be used in many places where metal or other material parts are now used. Moreover, it allows plastic models of objects to be quickly, and economically provided, prior to the decision to make more expensive metal or other material parts.

Hence, the new and improved stereolithographic methods and apparatus of the present invention satisfy a long existing need for an improved CAD and CAM system capable of rapidly, reliably, accurately and economically designing and fabricating three-dimensional parts and the like with reduced stress, curl, birdnesting or other distortions.

The above and other objects and advantages of this invention will be apparent from the following more detailed description when taken in conjunction with the accompanying drawings of illustrative embodiments.

BRIEF DESCRIPTION THE DRAWINGS

FIG. 2 and 3 are flow charts illustrating the basic concepts employed in practicing the method of stereolithography of the present invention;

Figure 8:
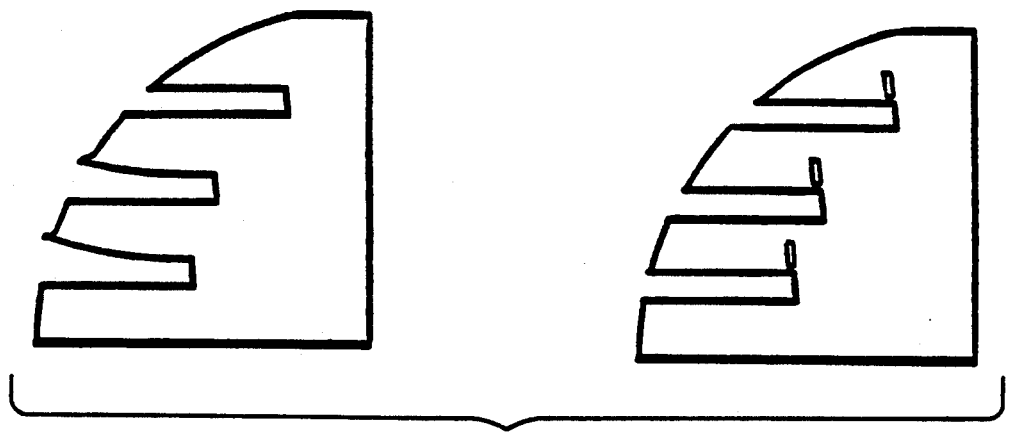
Figure 9:
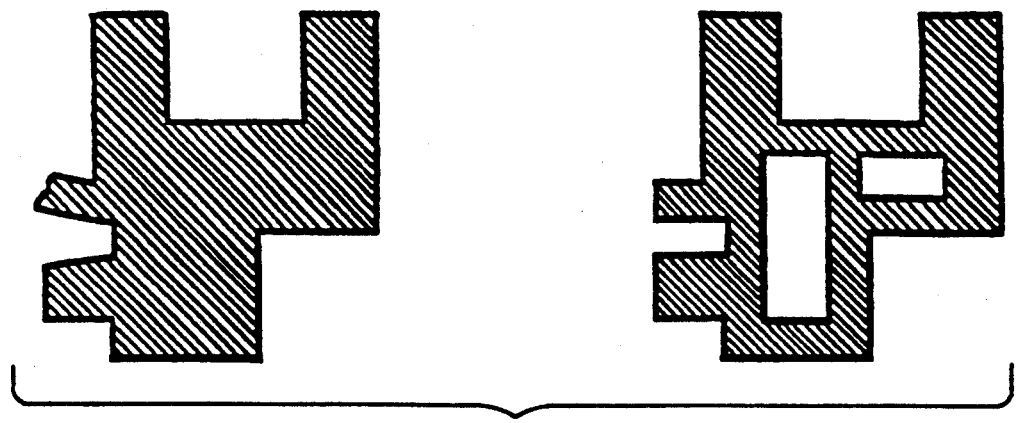
Figure 10:
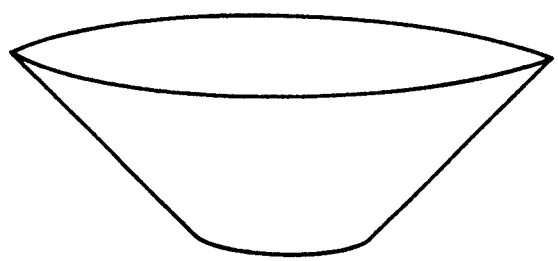
Figure 11:
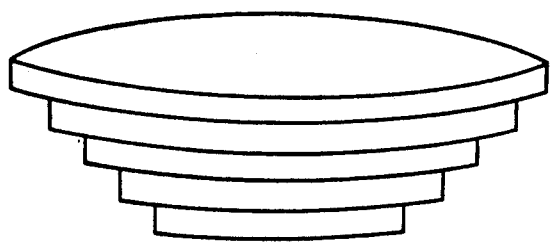
Figure 12:
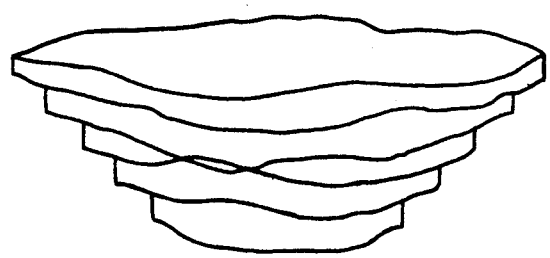
Figure 13:
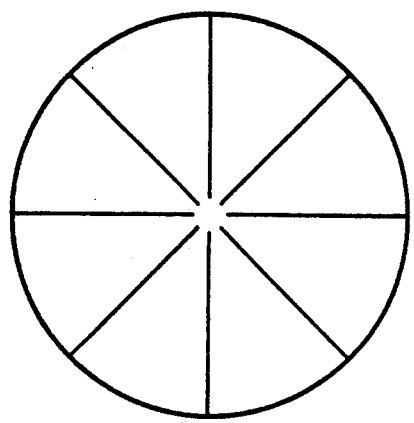
Figure 14:
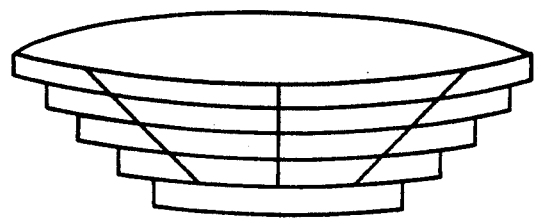
Figure 15A:
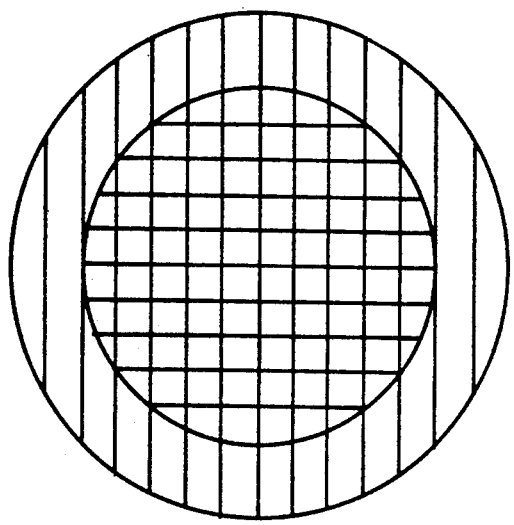
Figure 15B:
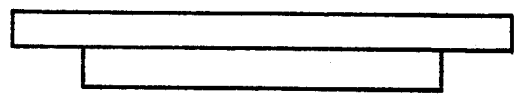
Figure 16:
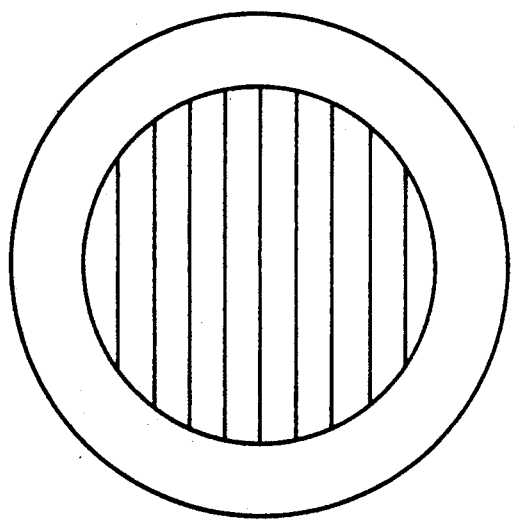
Figure 17:
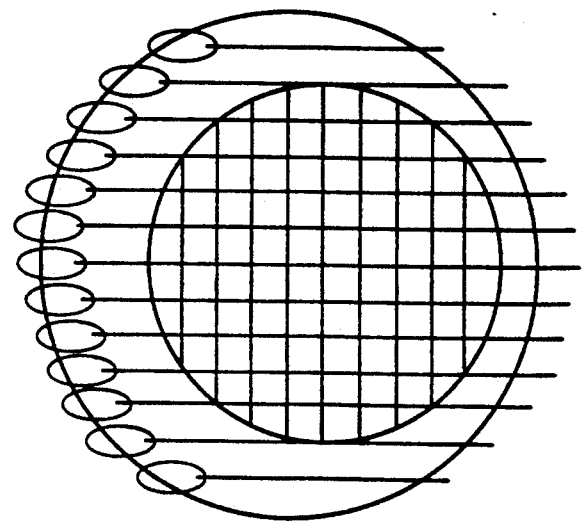

FIG. 8 schematically depicts the application of smalleys to a typical curling situation;

FIG. 9 illustrates, in section, the application of smalleys for inhibiting curl in thick interior structures;

FIG. 10 is a side view of a CAD designed cone without smalleys;

FIG. 11 and 12 are views of the sliced CAD designed cone and what it might look like after building;

FIG. 13 is a top view of a CAD designed cone showing possible locations in the XY plane where smalleys might be inserted;

FIG. 14 is a side view of a sliced CAD designed cone with smalleys and what it might look like after building;

FIG. 15 is a top view of two cross-sections of a cone with no smalleys;

FIG. 16 is a top view of two cross-sections of a cone with the second layer only showing the boundary vectors drawn;

FIG. 17 is a top view of two cross-sections of a cone with the second layer showing the boundary vectors not making contact with cross-hatch in a particular location;

FIG. 18 is a top view of two cross-sections of a cone with smalleys;

FIG. 19 is a top view of a two cross-sections of a cone with smalleys with the second layer only showing the boundary vectors drawn; an FIG. 20 is a top view of two cross-sections of a cone with smalleys with the second layer showing the boundary vectors making contact with cross-hatch everywhere.

DETAILED DESCRIPTION OF THE PREFERRED EMBODIMENT

In accordance with the invention, distortion is reduced by isolating sections of an object so that stress cannot be transmitted from one section to another. This isolation technique (smalleys) limits the distortion in a given section to that which can be caused by the stress developed within that section only, not from other sections.

Figure 1:
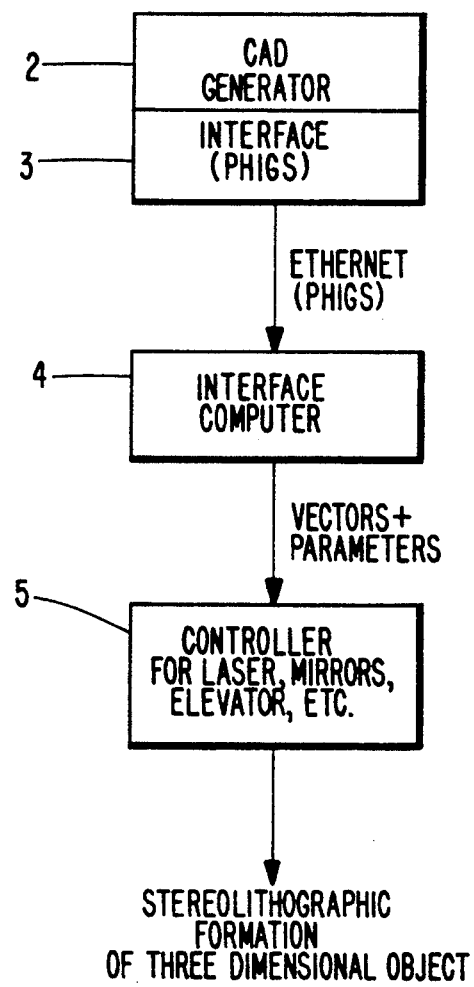
FIG. 1 is an overall block diagram of a stereolithography system for the practice of the present invention.

Referring now to the drawings, and particularly to FIG. 1 thereof, there is shown a block diagram of an overall stereolithography system suitable for practicing the present invention. A CAD generator 2 and appropriate interface 3 provide a data description of the object to be formed, typically in PHIGS format, via network communication such as ETHERNET or the like to an interface computer 4 where the object data is manipulated to optimize the data and provide output vectors which reduce stress, curl and distortion, and increase resolution, strength, accuracy, speed and economy of reproduction, even for rather difficult and complex object shapes. The interface computer 4 generates layer data by slicing, varying layer thickness rounding polygon vertices, filling, generating boundaries, near-flat skins, up-facing and down-facing skins, scaling, cross-hatching, offsetting vectors and ordering of vectors.

The vector data and parameters from the computer 4 are directed to a controller subsystem 5 for operating the system stereolithography laser, mirrors, elevator and the like.

FIGS. 2 and 3 are flow charts illustrating the basic system of the present invention for generating three-dimensional objects by means of stereolithography.

Many liquid state chemicals are known which can be induced to change to solid state polymer plastic by irradiation with ultraviolet light (UV) or other forms of synergistic stimulation such as electron beams, visible or invisible light, reactive chemicals applied by ink jet or via a suitable mask. UV curable chemicals are currently used as ink for high speed printing, in processes of coating paper and other materials, as adhesives, and in other specialty areas.

Lithography is the art of reproducing graphic objects, using various techniques. Modern examples include photographic reproduction, xerography, and microlithography, as is used in the production of microelectronics. Computer generated graphics displayed on a plotter or a cathode ray tube are also forms of lithography, where the image is a picture of a computer coded object.

Computer aided design (CAD) and computer aided manufacturing (CAM) are techniques that apply the abilities of computers to the processes of designing and manufacturing. A typical example of CAD is in the area of electronic printed circuit design, where a computer and plotter draw the design of a printed circuit board, given the design parameters as computer data input. A typical example of CAM is a numerically controlled milling machine, where a computer and a milling machine produce metal parts, given the proper programming instructions. Both CAD and CAM are important and are rapidly growing technologies.

A prime object of the present invention is to harness the principles of computer generated graphics, combined with UV curable plastic and the like, to simultaneously execute CAD and CAM, and to produce three-dimensional objects directly from computer instructions. This invention, referred to as stereolithography, can be used to sculpture models and prototypes in a design phase of product development, or as a manufacturing device, or even as an art form. The present invention enhances the developments in stereolithography set forth in U.S. Pat. No. 4,575,330, issued Mar. 11, 1986, to Charles W. Hull.

Referring now more specifically to FIG. 2 of the drawing, the stereolithographic method is broadly outlined. Step 8 calls for generation of CAD or other data, typically in digital form, representing a three-dimensional object to be formed by the system. This CAD data usually defines surfaces in polygon format, triangles and normals perpendicular to the planes of those triangles, e.g., for slope indications, being presently preferred, and in a presently preferred embodiment of the invention conforms to the Programmer's Hierarchial Interactive Graphics System (PHIGS) now adapted as an ANSI standard. This standard is described, by way of example in the publication "Understanding PHIGS", published by Template, Megatek Corp., San Diego, Calif.

In Step 9, the PHIGS data or its equivalent is converted, in accordance with the invention, by a unique conversion system to a modified data base for driving the stereolithography output system in forming three-dimensional objects. In this regard, information defining the object is specially processed to reduce stress, curl and distortion, and increase resolution, strength and accuracy of reproduction.

Step 10 in FIG. 2 calls for the generation of individual solid laminae representing cross-sections of a three-dimensional object to be formed. Step 11 combines the successively formed adjacent lamine to form the desired three-dimensional object which has been programmed into the system for selective curing.

Hence, the stereolithographic system of the present invention generates three-dimensional objects by creating a cross-sectional pattern of the object to be formed at a selected surface of a fluid medium, e.g. a UV curable liquid or the like, capable of altering its physical state in response to appropriate synergistic stimulation such as impinging radiation, electron beam or other particle bombardment, or applied chemicals (as by ink jet or spraying over a mask adjacent the fluid surface), successive adjacent laminae, representing corresponding successive adjacent cross-sections of the object, being automatically formed and integrated together to provide a step-wise laminar or thin layer buildup of the object, whereby a three-dimensional object is formed and drawn from a substantially planar or sheet-like surface of the fluid medium during the forming process.

The aforedescribed technique illustrated in FIG. 2 is more specifically outlined in the flowchart of FIG. 3, where again Step 8 calls for generation of CAD or other data, typically in digital form, representing a three-dimensional object to be formed by the system. Again, in Step 9, the PHIGS data is converted by a unique conversion system to a modified data base for driving the stereolithography output system in forming three-dimensional objects. Step 12 calls for containing a fluid medium capable of solidification in response to prescribed reactive stimulation. Step 13 calls for application of that stimulation as a graphic pattern, in response to data output from the computer 4 in FIG. 1, at a designated fluid surface to form thin, solid, individual layers at that surface, each layer representing an adjacent cross-section of a three-dimensional object to be produced. In the practical application of the invention, each lamina will be a thin lamina, but thick enough to be adequately cohesive in forming the cross-section and adhering to the adjacent laminae defining other cross-sections of the object being formed.

Step 14 in FIG. 3 calls for superimposing successive adjacent layers or laminae on each other as they are formed, to integrate the various layers and define the desired three-dimensional object. In the normal practice of the invention, as the fluid medium cures and solid material forms to define one lamina, that lamina is moved away from the working surface of the fluid medium and the next lamina is formed in the new liquid which replaces the previously formed lamina, so that each successive lamina is superimposed and integral with (by virtue of the natural adhesive properties of the cured fluid medium) all of the other cross-sectional laminae. Of course, as previously indicated, the present invention also deals with the problems posed in transitioning between vertical and horizontal.

The process of producing such cross-sectional laminae is repeated over and over again until the entire three-dimensional object has been formed. The object is object which m be identical to the previous object or ay may be an entirely new object formed by changing the program controlling the stereolithographic system.

Figure 4:
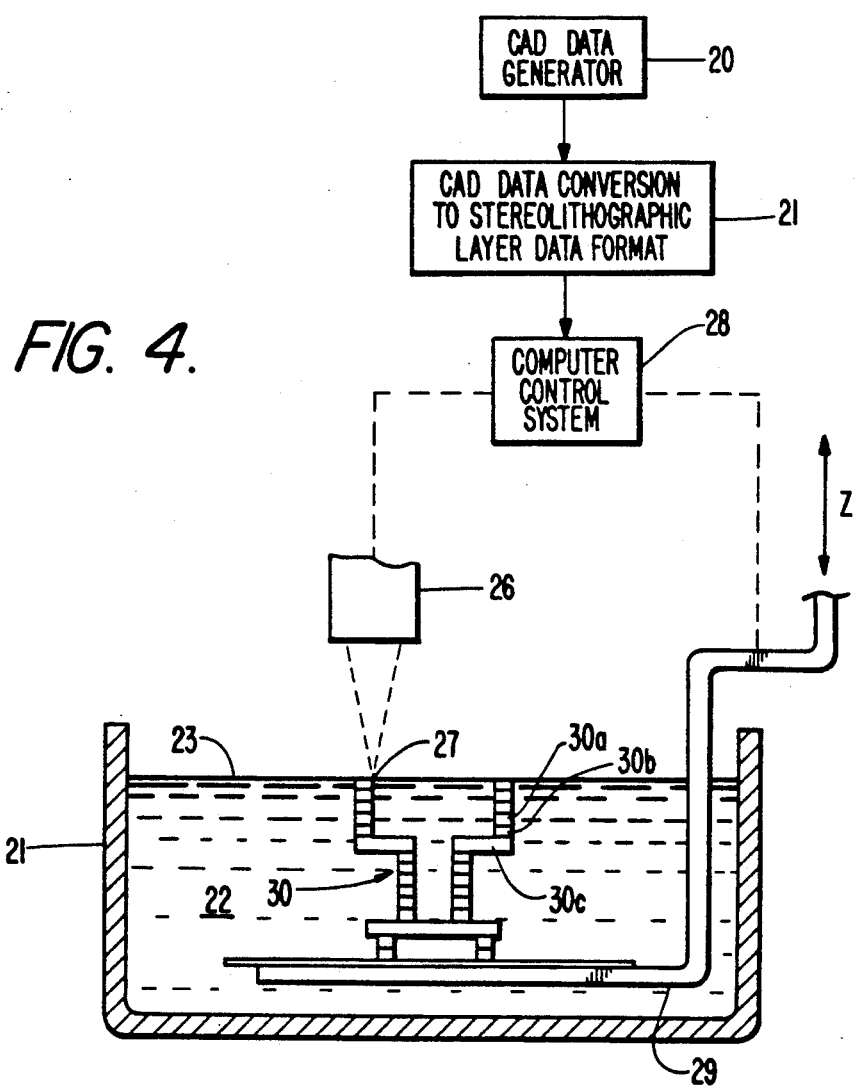
FIG. 4 is a combined block diagram, schematic and elevational section view of a system suitable for practicing the invention.
Figure 5:
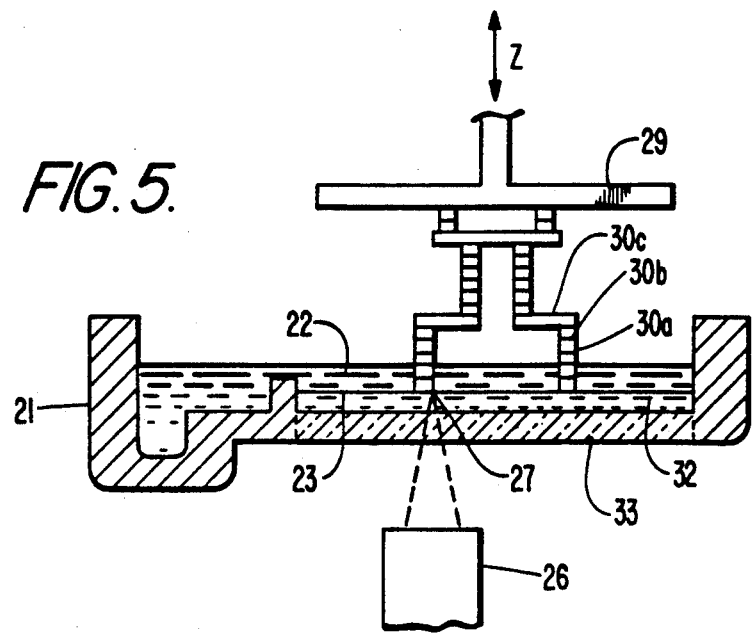
FIG. 5 is an elevational sectional view of a second embodiment of a stereolithography system for the practice of the invention.

FIGS. 4–5 of the drawings illustrate various apparatus suitable for implementing the stereolithographic methods illustrated and described by the systems and flow charts of FIGS. 1–3.

As previously indicated, "Stereolithography" is a method and apparatus for making solid objects by successively "printing" thin layers of a curable material, e.g., a UV curable material, one on top of the other. A programmable movable spot beam of UV light shining on a surface or layer of UV curable liquid is used to form a solid cross-section of the object at the surface of the liquid. The object is then moved, in a programmed manner, away from the liquid surface by the thickness of one layer and the next cross-section is then formed and adhered to the immediately preceding layer defining the object. This process is continued until the entire object is formed.

Essentially all types of object forms can be created with the technique of the present invention. Complex forms are more easily created by using the functions of a computer to help generate the programmed commands and to then send the program signals to the stereolithographic object forming subsystem.

The data base of a CAD system can take several forms. One form, as previously indicated, consists of representing the surface of an object as a mesh of triangles (PHIGS). These triangles completely form the inner and outer surfaces of the object. This CAD representation also includes a unit length normal vector for each triangle. The normal points away from the solid which the triangle is bounding. This invention provides a means of processing such CAD data into the layer-by-layer vector data that is necessary for forming objects through stereolithography.

For stereolithography to successfully work, there must be good adhesion from one layer to the next. Hence, plastic from one layer must overlay plastic that was formed when the previous layer was built. In building models that are made of vertical segments, plastic that is formed on one layer will fall exactly on previously formed plastic from the preceding layer, and thereby provide good adhesion. As one starts to make a transition from vertical to horizontal features, using finite jumps in layer thickness, a point may eventually be reached where the plastic formed on one layer does not make contact with the plastic formed on the previous layer, and this causes severe adhesion problems. Horizontal surfaces themselves do not present adhesion problems because by being horizontal the whole section is built on one layer with side-to-side adhesion maintaining structural integrity. Therefore, means are provided for insuring adhesion between layers when making transitions from vertical to horizontal or horizontal to vertical sections, as well as providing a way to completely bound a surface, and ways to reduce or eliminate stress and strain in formed parts.

A presently preferred embodiment of a new and improved stereolithographic system is shown in elevational cross-section in FIG. 4. A container 21 is filled with a UV curable liquid 22 or the like, to provide a designated working surface 23. A programmable source of ultraviolet light 26 or the like produces a spot of ultraviolet light 27 in the plane of surface 23. The spot 27 is movable across the surface 23 by the motion of mirrors or other optical or mechanical elements (not shown in FIG. 4) used with the light source 26. The position of the spot 27 on surface 23 is controlled by a computer control system 28. As previously indicated, the system 28 may be under control of CAD data produced by a generator 20 in a CAD design system or the like and directed in PHIGS format or its equivalent to a computerized conversion system 25 where information defining the object is specially processed to reduce stress, curl and distortion, and increase resolution, strength and accuracy of reproduction.

A movable elevator platform 29 inside container 21 can be moved up and down selectively, the position of the platform being controlled by the system 28. As the device operates, it produces a three-dimensional object 30 by step-wise buildup of integrated laminae such as 30a, 30b, 30c.

The surface of the UV curable liquid 22 is maintained at a constant level in the container 21, and the spot of UV light 27, or other suitable form of reactive stimulation, of sufficient intensity to cure the liquid and convert it to a solid material is moved across the working surface 23 in a programmed manner. As the liquid 22 cures and solid material forms, the elevator platform 29 that was initially just below surface 23 is moved down from the surface in a programmed manner by any suitable actuator. In this way, the solid material that was initially formed is taken below surface 23 and new liquid 22 flows across the surface 23. A portion of this new liquid is, in turn, converted to solid material by the programmed UV light spot 27, and the new material adhesively connects to the material below it. This process is continued until the entire three-dimensional object 30 is formed. The object 30 is then removed from the container 21, and the apparatus is ready to produce another object. Another object can then be produced, or some new object can be made by changing the program in the computer 28.

The curable liquid 22, e.g., UV curable liquid, must have several important properties. (A) It must cure fast enough with the available UV light source to allow practical object formation times. (B) It must be adhesive, so that successive layers will adhere to each other. (C) Its viscosity must be low enough so that fresh liquid material will quickly flow across the surface when the elevator moves the object. (D) It should absorb UV so that the film formed will be reasonably thin. (E) It must be reasonably soluble in some solvent in the liquid state, and reasonably insoluble in that same solvent in the solid state, so that the object can be washed free of the UV cure liquid and partially cured liquid after the object has been formed. (F) It should be as non-toxic and non-irritating as possible.

The cured material must also have desirable properties once it is in the solid state. These properties depend on the application involved, as in the conventional use of other plastic materials. Such parameters as color, texture, strength, electrical properties, flammability, and flexibility are among the properties to be considered. In addition, the cost of the material will be important in many cases.

The UV curable material used in the presently preferred embodiment of a working stereolithograph (e.g., FIG. 3) is DeSoto SLR 800 stereolithography resin, made by DeSoto, Inc. of Des Plains, Ill.

The light source 26 produces the spot 27 of UV light small enough to allow the desired object detail to be formed, and intense enough to cure the UV curable liquid being used quickly enough to be practical. The source 26 is arranged so it can be programmed to be turned off and on, and to move, such that the focused spot 27 moves across the surface 23 of the liquid 22.

Thus, as the spot 27 moves, it cures the liquid 22 into a solid, and "draws" a solid pattern on the surface in much the same way a chart recorder or plotter uses a pen to draw a pattern on paper.

The light source 26 for the presently preferred embodiment of a stereolithography is typically a helium-cadmium ultraviolet laser such as the Model 4240-N HeCd Multimode Laser, made by Liconix of Sunnyvale, Calif.

In the system of FIG. 4, means may be provided to keep the surface 23 at a constant level and to replenish this material after an object has been removed, so that the focus spot 27 will remain sharply in focus on a fixed focus plane, thus insuring maximum resolution in forming a layer along the working surface. In this regard, it is desired to shape the focal point to provide a region of high intensity right at the working surface 23, rapidly diverging to low intensity and thereby limiting the depth of the curing process to provide the thinnest appropriate cross-sectional laminae for the object being formed.

The elevator platform 29 is used to support and hold the object 30 being formed, and to move it up and down as required. Typically, after a layer is formed, the object 30 is moved beyond the level of the next layer to allow the liquid 22 to flow into the momentary void at surface 23 left where the solid was formed, and then it is moved back to the correct level for the next layer. The requirements for the elevator platform 29 are that it can be moved in a programmed fashion at appropriate speeds, with adequate precision, and that it is powerful enough to handle the weight of the object 30 being formed. In addition, a manual fine adjustment of the elevator platform position is useful during the set-up phase and when the object is being removed.

The elevator platform 29 can be mechanical, pneumatic, hydraulic, or electrical and may also use optical or electronic feedback to precisely control its position. The elevator platform 29 is typically fabricated of either glass or aluminum, but any material to which the cured plastic material will adhere is suitable.

A computer controlled pump (not shown) may be used to maintain a constant level of the liquid 22 at the working surface 23. Appropriate level detection system and feedback networks, well known in the art, can be used to drive a fluid pump or a liquid displacement device, such as a solid rod (not shown) which is moved out of the fluid medium as the elevator platform is moved further into the fluid medium, to offset changes in fluid volume and maintain constant fluid level at the surface 23. Alternatively, the source 26 can be moved relative to the sensed level 23 and automatically maintain sharp focus at the working surface 23. All of these alternatives can be readily achieved by appropriate data operating in conjunction with the computer control system 28.

Figure 6:
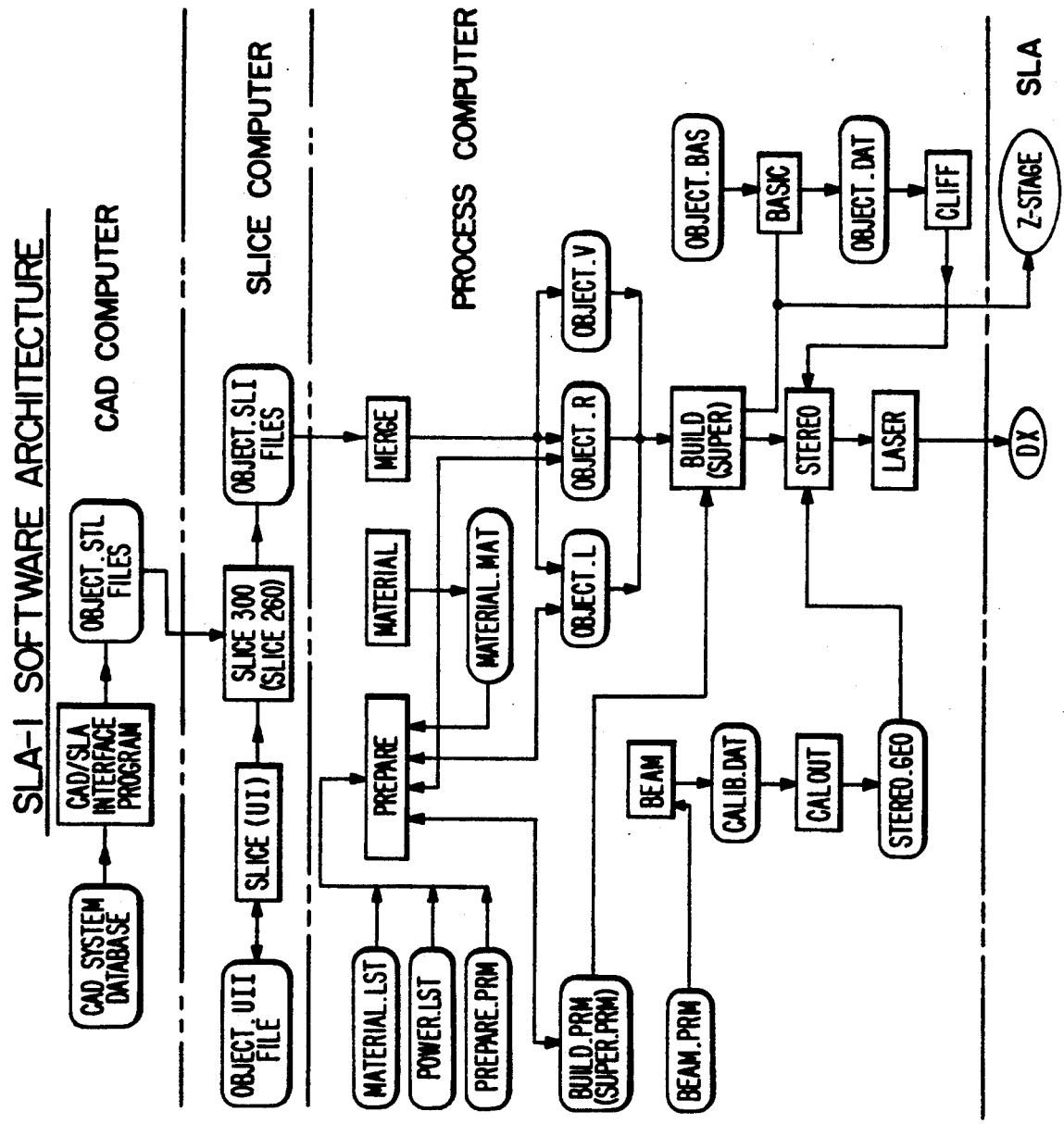
FIG. 6 is a software architecture flowchart depicting in greater detail the overall data flow, data manipulation and data management in a stereolithography system.

FIG. 6 of the drawings illustrates the overall software architecture of a stereolithography system in which the present invention ma be practiced.

As an overview, the portion of our processing referred to as "SLICE" takes in the object that you want to build, together with any scaffolding or supports that are necessary to make it more buildable. These supports are typically generated by the user's CAD. The first thing SLICE does is to find the outlines of the object and its supports.

SLICE defines each microsection or layer one at a time under certain specified controlling styles. SLICE produces a boundary to the solid portion of the object. If, for instance, the object is hollow, there will be an outside surface and an inside one. This outline then is the primary information. The SLICE program then takes that outline or series of outlines and says, but if you build an outside skin and an inside skin they won't join to one another, you'll have liquid between them. It will collapse. So let us turn this into a real product, a real part by putting in cross-hatching between the surfaces or solidifying everything inbetween or adding skins where there is so gentle a slope that one layer wouldn't join on top of the next, remembering past history or slope of the triangles (PHIGS) whichever way you look at it. SLICE does all those things and may use some lookup tables of the chemical characteristics of the photopolymer, how powerful the laser is, and related parameters to indicate how long to expose each of the output vectors used to operate the system. That output consists of identifiable groups. One group consists of the boundaries or outlines. Another group consists of cross-hatches. A third group consists of skins and there are subgroups of those, upward facing skins, downward facing skins which have to be treated slightly differently. These subgroups are all tracked differently because they may get slightly different treatment, in the process the output data is then appropriately managed to form the desired object and supports. Additional detail is provided in U.S. application Ser. No. 182,830.

After the three-dimensional object 30 has been formed, the elevator platform 29 is raised and the object is removed from the platform for post processing.

In addition, there may be several containers 21 used in the practice of the invention, each container having a different type of curable material that can be automatically selected by the stereolithographic system. in this regard, the various materials might provide plastics of different colors, or have both insulating and conducting material available for the various layers of electronic products.

As will be apparent from FIG. 5 of the drawings, there is shown an alternate configuration of a stereolithograph wherein the UV curable liquid 22 or the like floats on a heavier UV transparent liquid 32 which is non-miscible and non-wetting with the curable liquid 22. By way of example, ethylene glycol or heavy water are suitable for the intermediate liquid layer 32. In the system of FIG. 4, the three-dimensional object 30 is pulled up from the liquid 22, rather than down and further into the liquid medium, as shown in the system of FIG. 3.

The UV light source 26 in FIG. 5 focuses the spot 27 at the interface between the liquid 22 and the non-miscible intermediate liquid layer 32, the UV radiation passing through a suitable UV transparent window 33, of quartz or the like, supported at the bottom of the container 21. The curable liquid 22 is provided in a very thin layer over the non-miscible layer 32 and thereby has the advantage of limiting layer thickness directly rather than relying solely upon absorption and the like to limit the depth of curing since ideally an ultrathin lamina is to be provided. Hence, the region of formation will be more sharply defined and some surfaces will be formed smoother with the system of FIG. 5 than with that of FIG. 4. In addition a smaller volume of UV curable liquid 22 is required, and the substitution of one curable material for another is easier A commercial stereolithography system will have additional components and subsystems besides those previously shown in connection with the schematically depicted systems of FIGS. 1-5. For example, the commercial system would also have a frame and housing, and a control panel. It should have means to shield the operator from excess UV and visible light, and it may also have means to allow viewing of the object 30 while it is being formed. Commercial units will provide safety means for controlling ozone and noxious fumes, as well as conventional high voltage safety protection and interlocks. Such commercial units will also have means to effectively shield the sensitive electronics from electronic noise sources.

The present invention addresses some problems encountered in the practice of stereolithography. Each new layer of a stereolithographic part tends to pull upward on the next lower layer while it is being formed. This is a direct result of stresses created by the curing layer as the liquid is converted to solid. This action may cause both layers to curl upward, dependent on the geometry of the layers and whether or not the lower layer is securely held in place either by supports or by strong adhesion to the next lower layer. Certain of these shapes are more susceptible to curling, and may require special design features known as smalleys in order to inhibit or minimize curl.

Stresses are created in the curing layer in two ways. First, the liquid plastics used in stereolithography are less dense than as a solid. This means that the solid will take up less volume and will tend to pull on the lower layer as it shrinks. Second, the plastic expands when it is heated by the polymerization process and subsequently contracts as it cools. Since the new layer formed by the laser is firmly bonded to the lower layer, it tends to pull upward on the lower layer as it cools.

There are several methods available to ensure that stresses are maintained at a level that will not cause curling. One is the use of resins whose properties minimize thermal expansion and contraction. These resins are in development, but may still not solve the curling problem for all applications.

The second method, in accordance with this invention, is to isolate sections of a part so that the stresses cannot propagate over large distances and will not be transmitted beyond certain stress points in the part.

Layer sections prone to curling may be isolated by designing small holes or gaps at stress points in the CAD design of the part. These gaps, called "smalleys", block propagation of stresses along layer sections. This reduces the stresses acting on a part to only those created within the section. If the smalleys are properly designed, these localized stresses will be below the threshold value which would curl the layer section.

Hence, smalleys inhibit the transmission of stress from one section to another. They also serve to limit the stress to an amount that Will minimize distortion in a given section (by limiting the stress before it gets large enough to cause distortion). Smalleys are generally designed on the CAD to be 15 to 30 mils wide (depending on the expected cure width). They are also generally designed 40 to 80 mils tall (depending on the strength of the material and part geometry). When the material is cured, the smalleys narrow by a full cure width of material. Hence, the right choice of design width can yield smalleys that are almost completely hidden after post curing. It must be noted, however, that smalleys must be designed so that when boundary vectors are drawn the smalleys do not completely close. This is typically accomplished during the CAD design of the object. When we implement the ability to offset vectors to account for finite cure width of material, the width of design of smalleys can be reduced to a few mils.

A floating or unsupported line of plastic does not distort from its drawn shape. it distorts only when another curing line of plastic comes into contact with it. This second line of plastic shrinks as it is drawn, so if it contacts the first (previously cured) line, the first line will be bent towards the second. If we consider the first line to be constrained in some manner, the distortion caused by the second line will be affected by the constraints to the extent that distortion will only occur in the areas of least resistance. If small gaps are made in this second line, then any stress that develops from the contact with the first line will be isolated between the gaps. If the gaps are used to separate regions of strong structural strength from weaker regions, the stresses from the strong regions cannot propagate to the weaker ones and cause distortion there. Distortion at any point will be less because the stress at that point is less.

Vertical distortions are a primary problem so we are generally concerned with placing smalleys in regions on layers above a critical layer, such as above the first layer of an unsupported region. Generally smalleys are used to isolate regions from stress until they build up enough structural integrity to withstand the stress induced by curing successive layers. This will generally require that the smalleys be several layers in height. After sufficient strength is developed, the smalleys can be removed.

There are several ways that smalleys can be used to reduce distortion in an object:

(1) Smalleys can be used to reduce distortion (separation of layers) and curl in solid areas of objects. This is especially true for cylindrical objects, but also true for other object geometries that have problems with distortion.

(2) Smalleys can be placed at the ends of unsupported regions to reduce the distortion of the unsupported regions. This is especially true for upper edges of windows which are curved, and at the edge of a cantilever beam. Smalleys used in this way must be placed one layer (no more, no less) above the unsupported region.

(3) Smalleys can be used to reduce distortion in objects with wide internal regions by hollowing out these regions.

DESIGNING SMALLEYS

The key to effective use of smalleys is their proper placement at stress points in the CAD design. The following examples describe layer sections where smalleys ar typically used.

Example A

Figure 7:
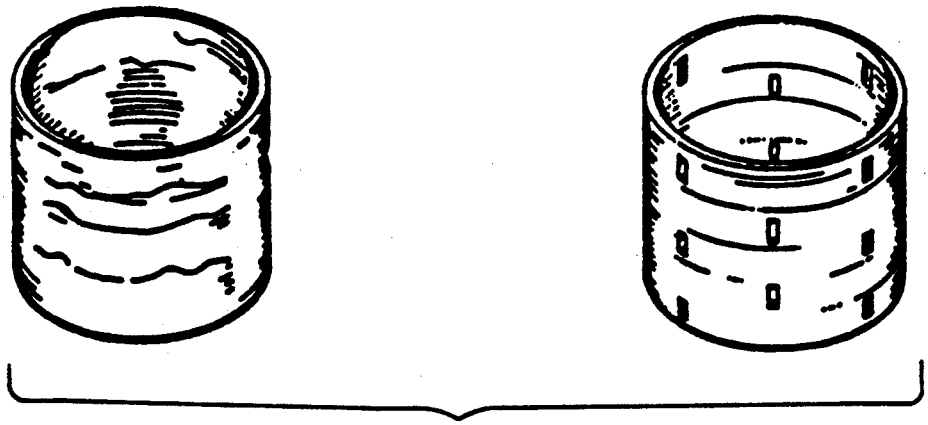
FIG. 7 illustrates perspectives of a distorted part and one with distortion minimized through the use of "smalleys."

The continuous layer borders (LBs) of the cylindrical part shown in FIG. 7 generate relatively large stresses. These stresses may cause curling if the layers are not adequately adhered to one another.

As shown in FIG. 7, smalleys should be placed at 90 degree intervals around the circumference of the part, with each smalley typically being 4 to 5 slice layers tall. Each successive set of smalleys should be offset about 45 degrees to maintain the structural integrity of the part.

Example B

The unsupported upper edges of the curved windows shown in FIG. 8 are highly susceptible to curling. Design smalleys at the ends of the windows, as shown, but leave one continuous LB under each smalley.

Example C

The thick interior structure of the part shown in FIG. 9 will tend to curl the exterior flanges and other unsupported surfaces. A large smalley, one that hollows out the interior of the part, as shown, will minimize these stresses.

Smalleys are typically designed on the CAD to be 15 to 30 mils wide and 40 to 80 mils tall. They generally decrease in size as the part is formed due to the viscous liquid filling the small gaps during dipping. Thus, if designed properly, smalleys will prevent curl and then effectively disappear or reduce in size to narrow slits or slight indentations on the surface of the part during post curing.

Smalleys are also used to reduce birdnesting. The width of smalleys, for this application, is generally less than 1 cure width, so that after curing they are completely filled in and so no structural integrity is lost through their use. Smalleys are placed periodically in regions of down-facing, near-flat triangles with heights appropriate to extend vertically through the near-flat triangles. The placement of smalleys is based on several factors that affect the likelihood of having birdnesting problems. The radius of curvature of the boundaries, the length of near-flat zones, the likelihood of boundaries moving, etc. are significant. Smalleys do not need to penetrate completely through a wall, as they do in their other application, but they do need to penetrate deep enough to insure a contact point with the boundaries on the previous layer.

Birdnesting can occur in objects that do not have near-flat triangles, but only when there are adhesion problems between layers (for example, when an object is built using dip delays that are too short). Smalleys can be used in these situations to help eliminate birdnesting also.

Smalleys can be used in a variety of situations that have down-facing near-flat skin. FIG. 10 is a side view of a CAD designed cone without smalleys. FIGS. 11 and 12 are views of the sliced CAD designed cone and what it might look like after building. FIG. 13 is a top view of a CAD designed cone showing possible locations in the XY plane where smalleys might be inserted. FIG. 14 is a side view of a sliced CAD designed cone with smalleys and what it might look like after building.

Boundary vectors can move out of position for a couple of reasons: (1) convection currents within the liquid that can cause floating items to drift, (2) distortions of boundary vectors from making contact with already cured (but floating material), (3) newly cured material contacting, and distorting, boundary vectors before they are secured into position, and (4) shrinking of hatch as it starts to secure one side of the boundary causing the boundary to be pulled out of position. A couple of these causes can affect boundary vectors that are not associated with near-flat triangles, so if problems are found in non-near-flat regions, smalleys may be useful.

Boundaries can only birdnest when they can move, or sections of them can move, far enough out of position so that when cross-hatching is drawn, it does not contact the boundaries. Smalleys avoid this problem by having the boundaries cut in over the top of the boundaries from the previous layer, on a periodic basis. This cutting in over the top of previously cured boundaries prevents the present boundaries from moving out of position.

FIG. 15 is a top view of two cross-sections of a cone with no smalleys. FIG. 16 is a top view of two cross-sections of a cone with the second layer only showing the boundary vectors drawn. FIG. 17 is a top view of two cross-sections of a cone with the second layer showing the boundary vectors not making contact with cross-hatch in a particular location. FIG. 18 is a top view of two cross-sections of a cone with smalleys. FIG. 19 is a top view of two cross-sections of a cone with smalleys with the second layer only showing the boundary vectors drawn. FIG. 20 is a top view of two cross-sections of a cone with smalleys with the second layer showing the boundary vectors making contact with cross-hatch everywhere.

An example of one embodiment of a commercial system, provided by 3D Systems, Inc. of Valencia, Calif., embodying the present invention, is illustrated and described by the enclosed appendices, wherein Appendix A is a manual describing the overall system for an early Model SLA-1 Beta Site Stereolithography System, including installation and operation, Appendix B is the first draft of the SLA-1 Software Manual together with a manual addendum for use with this earlier system, Appendix C is software source code listings for Version 2.62 for running an earlier stereolithograhy system, Appendix D is a Training Manual for the most recent version of the Model SLA-1 Stereolithography System, Appendix E is a parts list of the major components for the latest version of the Model SLA-1 Stereolithography System, Appendix F software source code listings for Version 3.03 for running the latest stereolithography system, Appendix G is a "Slice" Flow Chart Implementing Style 1, Appendix H is a "Slice" Flow Chart Implementing Style 2, and Appendix I is a Stereolithography Interface Specification for enabling provision of suitable interface between CAD equipment and the Model SLA-1 Stereolithography System.

The new and improved stereolithographic method and apparatus has many advantages over currently used methods for producing plastic objects. The method avoids the need of producing tooling drawings and tooling. The designer can work directly with the computer and a stereolithographic device, and when he is satisfied with the design as displayed on the output screen of the computer, he can fabricate a part for direct examination information defining the object being specially processed to reduce curl, stress, birdnesting and other distortions, and increase resolution, strength and accuracy of reproduction. If the design has to be modified, it can be easily done through the computer, and then another part can be made to verify that the change was correct. If the design calls for several parts with interacting design parameters, the method becomes even more useful because all of the part designs can be quickly changed and made again so that the total assembly can be made and examined, repeatedly if necessary.

After the design is complete, part production can begin immediately, so that the weeks and months between design and production are avoided. Ultimate production rates and parts costs should be similar to current injection molding costs for short run production, with even lower labor costs than those associated with injection molding. Injection molding is economical only when large numbers of identical parts are required. Stereolithography is particularly useful for short run production because the need for tooling is eliminated and production set-up time is minimal. Likewise, design changes and custom parts are easily provided using the technique. Because of the ease of making parts, stereolithography can allow plastic parts to be used in many places where metal or other material parts are now used. Moreover, it allows plastic models of objects to be quickly and economically provided, prior to the decision to make more expensive metal or other material parts.

The present invention satisfies a long existing need in the art for a CAD and CAM system capable of rapidly, reliably, accurately and economically designing and fabricating three-dimensional plastic parts and the like.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:

1. A method for producing a three-dimensional object from an object representation out of a medium capable of selective physical transformation upon exposure to synergistic stimulation, comprising the steps of:
   successively forming horizontal layers of said medium on top of previously-formed layers of said object;
   selectively exposing said layers of said medium to said synergistic stimulation in accordance with a building representation, having at least a portion which deviates from a corresponding portion of said object representation by inclusion of a deviation, to form said object substantially layer by layer;
   whereupon a portion of said object comprising at least one substantially formed layer of said object is created which deviates according to said deviation from said corresponding portion of said object representation by inclusion of an unexposed area; and
   wherein said area is situated near a boundary between a first portion of a first layer of said object which is not supported by a previously-formed layer, and a second portion of said first layer which is supported by a previously-formed layer, and whereupon said area is also situated above said first layer, to reduce distortion in said object.

2. The method of claim 1 wherein said area begins one layer above said first layer.

3. A method for producing a three-dimensional object from an object representation out of a medium capable of selective physical transformation upon exposure to synergistic stimulation, comprising:
   selectively exposing said medium to said synergistic stimulation in accordance with a building representation, having at least a portion which deviates from a corresponding portion of said object representation by inclusion of a deviation, whereupon said medium selectively physically transforms substantially layer by layer to form said object;
   whereupon a portion of said object comprising at least one substantially formed layer of said object is created which deviates according to said deviation from said corresponding portion of said object representation by inclusion of an unexposed area; and
   whereupon said area is situated within a substantially solid portion of said object to reduce stress in said object.

4. The method of claim 2 wherein the selective exposing step further comprises the substep of extending said area into additional layers of said object placed over said area, said additional layers of said object, at least in part, also placed over and adhered to said first unsupported portion of said first layer.

5. The method of claim 4 wherein the substep of extending comprises extending said area into said additional layers until said additional layers are strong enough to substantially withstand distortion.

6. A method for producing a three-dimensional object from a representation of the object out of a medium capable of selective physical transformation upon exposure to synergistic stimulation, comprising:
   selectively exposing said medium to said synergistic stimulation in accordance with a building representation, having at least a portion which deviates from a corresponding portion of said representation of the object by inclusion of a deviation, whereupon said medium physically transforms substantially layer by layer to form said object;
   whereupon a border of a layer of said object is created which deviates according to said deviation from said corresponding portion of said representation of the object by inclusion of a border deviation which adheres said border to previously transformed medium.

7. The method of claim 6 wherein the selective exposing step further comprises the substep of selectively creating a border deviation which at least partially encloses an area.

8. The method of claim 6 wherein the selective exposing step further comprises using said medium which is a photopolymer.

9. The method of claim 6 wherein the selective exposing step further comprises the substep of forming said object by successively forming horizontal layers of said object on top of previously formed layers, and adhering said horizontal layers to said previously formed layers.

10. The method of claim 7 wherein a cure width is induced in said medium upon exposure to a beam of said synergistic stimulation, the beam having a center, and wherein said selective exposing step further comprises creating a border deviation having an approximately constant width which is less than said cure width, and tracing said beam center of said beam along said border and deviation.

11. The method of claim 6, wherein a cure width is induced in said medium upon exposure to a beam of said synergistic stimulation, the beam having a beam center, and wherein said selective exposing step further comprises creating a border deviation having an approximately constant width, in a border adjacent to medium to be transformed, and tracing said beam center of said beam of synergistic stimulation, along an outline which is offset from said border deviation towards said medium to be transformed by about one-half of said cure width.

12. The method of claim 9 wherein the selective exposing step further comprises anchoring said border deviation to previously transformed medium on the layer of said border.

13. The method of claim 9 wherein the selective exposing step further comprises anchoring said border deviation to previously transformed medium on a layer which is below the layer of said border.

14. A method for producing a three-dimensional object out of a medium capable of selective physical transformation upon exposure to synergistic stimulation, comprising the steps of:
forming a building representation of the object which deviates from a corresponding object representation by inclusion of a deviation to reduce distortion in said object, the deviation specifying at least one unexposed area in a substantially formed layer of the object, which at least one area remains unexposed during formation of the layer, the layer having a first portion and a second portion, and the at least one unexposed area also substantially isolating the first portion from the second portion; and
selectively exposing said medium to said synergistic stimulation in accordance with said building representation to form said object substantially layer by layer.

15. A method for producing a three-dimensional object out of a medium capable of selective physical transformation upon exposure to synergistic stimulation, comprising the steps of:
forming a building representation of the object which deviates from a corresponding object representation by inclusion of a deviation to reduce distortion in said object, the deviation specifying an unexposed area in a substantially formed layer of the object, which area remains unexposed during formation of the layer, and which area is bounded at least in part from below by transformed medium; and
selectively exposing said medium to said synergistic stimulation in accordance with said building representation to form said object substantially layer by layer.

16. A method for producing a three-dimensional object out of a medium capable of selective physical transformation upon exposure to synergistic stimulation, comprising the steps of:
forming a building representation of the object which deviates from a corresponding object representation, specifying first and second connected surfaces, by inclusion of a deviation to reduce distortion in said object, the deviation specifying an unexposed area in at least one substantially formed layer, which area remains unexposed during formation of the layer, which area bridges said connected surfaces along a path, and which area is bounded only by transformed medium along said path; and
selectively exposing said medium to said synergistic stimulation in accordance with said building representation to form said object substantially layer by layer.

17. A method for producing a three-dimensional object out of a medium capable of selective physical transformation upon exposure to synergistic stimulation, comprising the steps of:
forming a building representation of the object which deviates from a corresponding object representation by inclusion of a deviation to reduce distortion in said object, the deviation specifying an unexposed area in at least one substantially formed layer, which area remains unexposed during formation of the layer, and which area connects regions of untransformed medium, wherein said regions of untransformed medium are not isolated in the absence of the deviation; and
selectively exposing said medium to said synergistic stimulation in accordance with said building representation to form said object substantially layer by layer.

18. A method for producing a three-dimensional object out of a medium capable of selective physical transformation upon exposure to synergistic stimulation, comprising the steps of:
forming a building representation of the object which deviates from a corresponding object representation, specifying an unsupported surface, by inclusion of a deviation, the deviation specifying an unexposed area in a substantially formed layer of the object, which area remains unexposed during formation of the layer, and which area is spaced above said unsupported surface by transformed medium; and
selectively exposing said medium to said synergistic stimulation in accordance with said building representation to form said object substantially layer by layer.

19. A method for producing a three-dimensional object out of a medium capable of selective physical transformation upon exposure to synergistic stimulation, comprising the steps of:
forming a building representation of the object which deviates from a corresponding object representation, specifying an unsupported surface, by inclusion of a deviation to reduce distortion in said object, the deviation specifying an unexposed area in at least one substantially formed layer of the object, which area remains unexposed during formation of the layer, which area begins one layer above said unsupported surface, and which area is spaced from the surface by transformed medium; and
selectively exposing said medium to said synergistic stimulation in accordance with said building representation to form said object substantially layer by layer.

20. The method of claim 14 further comprising forming said object out of a medium which is a photopolymer.

21. The method of claim 14 further comprising forming said object substantially from horizontal layers of said medium.

22. The method of claim 21 further comprising forming said object by placing newly formed layers on top of previously-formed layers.

23. The method of claim 14 further comprising filling said at least one area with a material capable of physical transformation upon exposure to synergistic stimulation after said substantially formed layer has been formed, and then exposing this material to synergistic stimulation whereupon the material physically transforms.

24. The method of claim 23 further comprising filling said at least one area with said material which is said medium.

25. The method of claim 14 further comprising inclusion of said deviation which specifies said at least one unexposed area extending inward form a curved outer surface of said object to reduce stress in said object.

26. The method of claim 14 further comprising inclusion of said deviation which specifies said at least one unexposed area extending along a substantially straight line through said object.

27. The method of claim 14 further comprising forming said object representation in a CAD/CAM system.

28. The method of claim 14 wherein said selectively exposing step comprises selectively directing a beam of said synergistic stimulation to a surface of said medium by means of rotatable mirrors responsive to said building representation.

29. An apparatus for producing a three-dimensional object out of a medium capable of selective physical transformation upon exposure to synergistic stimulation, comprising:

at least one computer programmed to form a building representation of the object which deviates from a corresponding object representation by inclusion of a deviation to reduce distortion in said object, the deviation specifying at least one unexposed area in a substantially formed layer of the object, the at least one unexposed area remaining unexposed during formation of the layer, the layer having a first portion and a second portion, and the at least on unexposed area also substantially isolating the first portion from the second portion; and means coupled to said at least one computer for receiving said building representation, and for selectively exposing said medium to said synergistic stimulation in accordance with said building representation to form said object substantially layer by layer.

30. An apparatus for producing a three-dimensional object out of a medium capable of selective physical transformation upon exposure to synergistic stimulation, comprising:

at least one computer programmed to form a building representation of the object which deviates from a corresponding object representation by inclusion of a deviation to reduce distortion in said object, the deviation specifying an unexposed area in a substantially formed layer of the object, which area remains unexposed during formation of the layer, and which area is bounded at least in part from below by transformed medium; and means coupled to said at least one computer for receiving said building representation, and for selectively exposing said medium to said synergistic stimulation in accordance with said building representation to form said object substantially layer by layer.

31. An apparatus for producing a three-dimensional object out of a medium capable of selective physical transformation upon exposure to synergistic stimulation, comprising:

at least one computer programmed to form a building representation of the object which deviates from a corresponding object representation, specifying first and second connected surfaces, by inclusion of a deviation to reduce distortion in said object, the deviation specifying an unexposed area in at least one substantially formed layer of the object, which are remains unexposed during formation of the layer, which area bridges said connected surfaces along a path, and which area is bounded only by transformed medium along said path; and means coupled to the at least one computer for receiving said building representation, and for selectively exposing said medium to said synergistic stimulation in accordance with said building representation to form said object substantially layer by layer.

32. An apparatus for producing a three-dimensional object out of a medium capable of selective physical transformation upon exposure to synergistic stimulation, comprising:

at least one computer programmed to form a building representation of the object which deviates from a corresponding object representation, by inclusion of a deviation to reduce distortion in said object, the deviation specifying an unexposed area in at least one substantially formed layer of the object, which area remains unexposed during formation of the layer, and which area connects regions of untransformed medium, wherein said regions of untransformed medium are not isolated in the absence of the deviation; and means coupled to the at least one computer for receiving said building representation, and for selectively exposing said medium to said synergistic stimulation in accordance with said building representation to form said object substantially layer by layer.

33. An apparatus for producing a three-dimensional object out of a medium capable of selective physical transformation upon exposure to synergistic stimulation, comprising:

at least one computer programmed to form a building representation of the object which deviates from a corresponding object representation, specifying an unsupported object surface, by inclusion of a deviation to reduce distortion in said object, the deviation specifying an unexposed area in a substantially formed layer of the object, which are remains unexposed during formation of the layer, and which area is spaced above said unsupported surface by transformed medium; and means coupled to the at least one computer for receiving said building representation, and for selectively exposing said medium to said synergistic stimulation in accordance with said building representation to form said object substantially layer by layer.

34. An apparatus for producing a three-dimensional object out of a medium capable of selective physical transformation upon exposure to synergistic stimulation, comprising:

at least one computer programmed to form a building representation of the object which deviates from a corresponding object representation, specifying an unsupported object surface, by inclusion of a deviation to reduce distortion in said object, the deviation specifying an unexposed area in at least one substantially formed layer of the object, which area remains unexposed during formation of the layer, which area begins one layer above said unsupported surface, and which area is spaced from the surface by transformed medium; and means coupled to the at least one computer for receiving said building representation, and for selectively exposing said medium to said synergistic stimulation in accordance with said building representation to form said object substantially layer by layer.

35. An apparatus for producing a three-dimensional object out of a medium capable of selective physical transformation upon exposure to synergistic stimulation, comprising:
  at least one computer programmed to form a building representation of the object which deviates from a corresponding object representation by inclusion of a deviation of a border of the object to reduce distortion in said object, the deviation specifying transformed medium which anchors said border to previously transformed medium; and
  means coupled to the at least one computer for receiving said building representation, and for selectively exposing said medium to said synergistic stimulation in accordance with said building representation to form said object substantially layer by layer.

36. The apparatus of claim 29 wherein said means coupled to said at least one computer further comprises means for forming said object substantially by successively forming horizontal layers.

37. The apparatus of claim 36 wherein said means coupled to said at least one computer further comprises means for placing newly formed layers on top of previously-formed layers.

38. The apparatus of claim 29 further comprising means for filling said at least one area with a material capable of physical transformation upon exposure to synergistic stimulation after said layer containing said at least one area has been formed, and exposing this material to synergistic stimulation.

39. The apparatus of claim 29 wherein said object has an outer surface curved in a region, and said at least one computer is programmed to situate said at least one area to extend inward from a location on said outer surface within said region, to reduce stress caused by said curved surface.

40. The apparatus of claim 29 wherein said at least one computer is programmed to situate said at least one area near a boundary between a first portion of a first layer of said object which is not supported by a previously-formed layer, and a second portion of said first layer which is supported by a previously formed layer, and to situate said at least one area above said first layer, to reduce distortion of said unsupported portion.

41. The apparatus of claim 40 wherein said at least one computer is programmed to situate said at least one area one layer above said first layer.

42. The apparatus of claim 30 wherein said at least one computer is programmed to situate said area within a solid portion of said object to reduce stress in said object.

43. The apparatus of claim 29 wherein said at least one computer is programmed to specify said at least one area as a substantially straight line through said object.

44. The apparatus of claim 40 wherein said at least one computer is programmed to extend said at least one area into additional layers of transformed medium placed over said at least one area, and said additional layers are also, at least in part, placed over and adhered to said first unsupported portion.

45. The apparatus of claim 44 wherein said at least one computer is programmed to extend said at least one area into said additional layers until said unsupported portion is strong enough to substantially withstand distortion.

46. The apparatus of claim 29 wherein said at least one computer comprises a CAD system.

47. The apparatus of claim 35 wherein said at least one computer is programmed to specify said border deviation which at least partially encloses an area.

48. The apparatus of claim 35 wherein said at least one computer is programmed to specify said border deviation which at least partially encloses an area of medium which is to be substantially transformed.

49. The apparatus of claim 35 wherein said border is in a layer, and said at least one computer is programmed to specify anchoring said border to previously transformed medium in said layer.

50. The apparatus of claim 35 wherein said border is in a layer, and said at least one computer is programmed to specify anchoring said border to previously transformed medium in a layer which is below the layer of said border.

* * * * *

UNITED STATES PATENT AND TRADEMARK OFFICE
CERTIFICATE OF CORRECTION

PATENT NO. : 5,015,424

DATED : May 14, 1991

INVENTOR(S) : DENNIS R. SMALLEY

It is certified that error appears in the above-identified patent and that said Letters Patent is hereby corrected as shown below:

Column 10, delete lines 66-67 in their entirety and replace with -- then removed and the system is ready to produce another object which may be identical to the previous object or may be an entirely new object formed by changing --.

Column 19, line 46, replace "wherein" with -- whereupon --.

Signed and Sealed this

Thirteenth Day of April, 1993

*Attest:*

STEPHEN G. KUNIN

*Attesting Officer*      *Acting Commissioner of Patents and Trademarks*